Dec. 8, 1964  P. PANHARD  3,160,235
DISC BRAKE CONTROLLED BY A FRUSTO-CONICAL MEMBER
Filed July 15, 1963
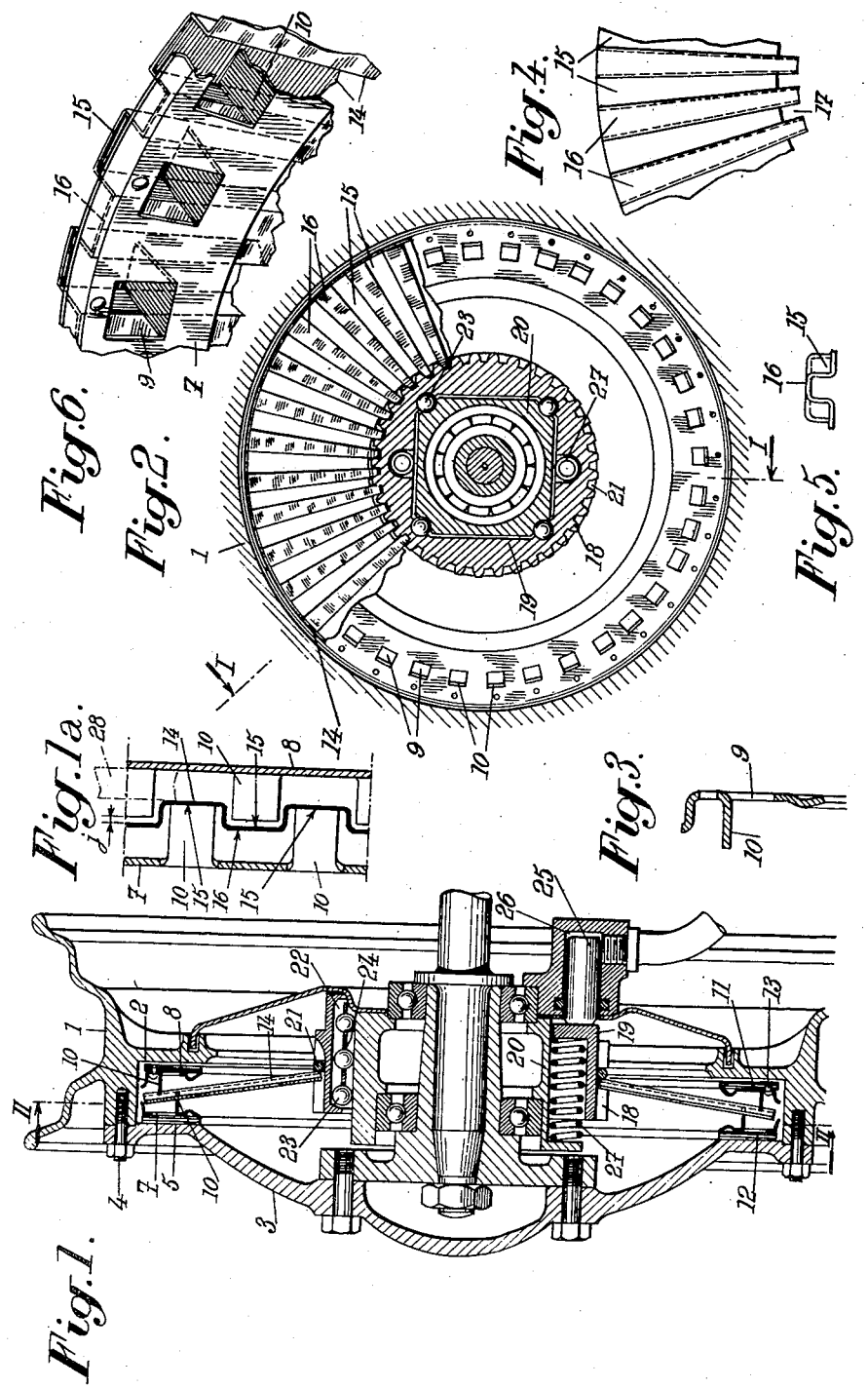

United States Patent Office 3,160,235
Patented Dec. 8, 1964

3,160,235
DISC BRAKE CONTROLLED BY A FRUSTO-CONICAL MEMBER
Paul Panhard, Paris, France, assignor to Société Anonyme des Anciens Etablissements Panhard & Levassor, Paris, Seine, France, a society of France
Filed July 15, 1963, Ser. No. 294,924
Claims priority, application France, July 17, 1962, 904,223
4 Claims. (Cl. 188—72)

The present invention relates to mechanisms, such as disc brakes, controlled by a frusto-conical member of variable apex angle, that is to say by a piece of substantially frusto-conical shape deformable to permit variations of its apex angle in order to control the axial displacements of at least one movable annular part coaxial with said member.

The object of the present invention is to provide a mechanism of this kind which is better adapted than those known up to this time to meet the requirements of practice, in particular concerning the operation of said frusto-conical member.

The mechanism according to the present invention is characterized by the fact that the frusto-conical member, the thickness of which is substantially uniform, is provided with alternate radial ridges and grooves so as to permit deformations of said member by relative displacement of its circular edges in a direction parallel to their common axis.

A preferred embodiment of the present invention will be hereinafter described with reference to the appended drawings, given merely by way of example, and in which:

FIG. 1 is a sectional view on the line I—I of FIG. 2 of an automobile vehicle wheel provided with a brake mechanism according to the invention;

FIG. 1a shows in side elevational view a portion of the discs of the brake and of the frusto-conical control member;

FIG. 2 is a view in section on the line II—II of FIG. 1;

FIG. 3 is a partial diametral section of one of the friction members of the brake mechanism;

FIGS. 4 and 5 are part views, respectively at right angles to each other, of the frusto-conical member of the brake mechanism;

FIG. 6 is a perspective part view showing one of the annular discs and the corresponding portion of the frusto-conical member.

Wheel 1 carries an annular surface 2 and it is connected with a cover 3 through bolts 4. Said cover 3 carries another annular friction surface 5 parallel to friction surface 2 located opposite it.

In the space between surfaces 2 and 5 are disposed two annular discs 7 and 8, for instance of light metal or steel sheet, said annular discs 7 and 8 being intended to be moved away from each other and applied against friction surfaces 2 and 5 respectively to produce the desired braking.

Annular discs 7 and 8 are provided with rectangular holes 9, the portions of said discs cut to form these holes remaining attached on one side to the corresponding disc 7 or 8 and all these portions being bent on the same side of the annular disc so as to obtain, for each disc, teeth 10 at equal intervals from one another and perpendicular to the plane of the disc. Linings 11 and 12 are secured to said discs 7 and 8 respectively by means of rivets 13. The teeth 10 of disc 8 are located on a cylindrical surface of a diameter greater than that of the cylindrical surface on which are located the teeth 10 of disc 7, and the two rows of teeth 10 thus formed are directed toward each other, that is to say toward the inside of the space between annular discs 7 and 8.

According to the present invention, the frusto-conical member 14 which serves to actuate annular discs 7 and 8, and which is advantageously made of a light metal, is provided with alternate grooves 15 and ridges 16 forming ribs extending along the generatrices of said frusto-conical member 14.

Said ribs cooperate with the teeth 10 of discs 7 and 8. In other words, on either side of member 14, the grooves 15 thereof are in mesh with the teeth 10 of disc 7 or 8.

Grooves 15 and ridges 16 may be of either equal or different widths (along a given circumference). The height of ridges 16, which may vary between the large circumference and the small circumference of the cone frustum, preferably averages 1/50 of the diameter of the large circumference of said member 14.

The radial ribs of member 14 have for their effect, while reinforcing it, of permitting a deformation thereof which varies the axial distance between the smaller circumferential edge and the larger circumferential edge thereof. It is thus possible to make said member 14 of relatively small thickness and therefore substantially to reduce the weight and cost of this member.

The initial strains created by the corrugating operation for producing said radial ribs are such that this member 14 is in the form of a very flat frustum of a cone having an apex angle close to 180°. The axial distance between the circular edges of said member 14 averages one half of the maximum possible deformation corresponding to the extreme cases where the brake mechanism is out of action, with fresh linings, the where said brake is being applied, with worn linings, respectively.

The lever arm ratio of such a frusto-conical member may be given the desired value by suitably choosing the relative dimensions of the teeth 10 of discs 7 and 8. In the embodiment shown by the drawings this ratio is equal to 1 to 6, which corresponds substantially to a multiplication by about 13 of the thrust that is exerted, since both of the discs 7 and 8 are subjected to this thrust.

Preferably ribs 15 and 16 form, at their inner ends, notches 17 intended to cooperate with the teeth 18 of a sleeve 19 through which the braking effort is transmitted to hub 20.

As a matter of fact the discs 7 and 8 are angularly fixed with respect to frusto-conical member 14 to which they transmit the braking torque due to the engagement of the teeth 10 of said discs 7 and 8 in the grooves 15 on either side of said member 14, as clearly visible in FIG. 6.

Control means are provided for moving the smaller circular edge of frusto-conical member 14. As illustrated by the drawings, said means comprise a ring 21 of circular cross section intended to transmit to said member 14 the thrust necessary for moving discs 7 and 8 away from each other and applying their respective linings against friction surfaces 2 and 5.

Said ring 21 is disposed on a sleeve 19 the axial displacement of which with respect to support 20 is ensured by four slideways the balls 23 of which are held in cage 24 subjected to the action of a suitable return spring.

It is thus possible to provide a single piston 25 slidable in a cylinder 26 to act upon sleeve 19. As a matter of fact even if there is some play in the slideways, the torque which is caused by the fact that piston 25 is acted upon at a single point cannot turn sleeve 19, that is to say wedge it with respect to fixed support 20, because as soon as a thrust is exerted upon the sleeve, the simultaneous appearance of the braking torque transmitted by member 14 to said sleeve has for its effect to apply the balls against one side of the slideway with a force proportional to the force exerted by piston 25 upon sleeve 19.

When the action of the piston ceases, the sleeve is restored to its position of rest essentially by the resiliency of member 14 and also by the action of return devices such for instance as springs 27.

Reaction rods may also be provided to connect the sleeve and the hub support.

Up to now nothing has been said of the depth of penetration of teeth 10 into the grooves 15 provided on each face of member 14.

Advantageously, and as shown by FIG. 1a, the teeth 10 of discs 7 are, at rest, in contact with the bottoms of the corresponding grooves 15, whereas the teeth 10 of disc 8, located on the external side of member 14, have, with respect to the bottoms of the grooves in which they are engaged, a play "$j$."

It is then possible—

Either to permit this play "$j$" to disappear at the beginning of the active displacement of member 14;

Or, preferably, to prevent said play from disappearing owing to the provision, between disc 8 and member 14, of a spacing annular member 28 located on the outside of the circumference formed by the teeth 10 of disc 8, said member 28 being interposed between disc 8 and the ridges 16 of frusto-conical member 14.

In a modification discs 7 and 8 and their linings are made of a single piece, for instance of a plastic material, provided with a series of projections playing the part of the above mentioned teeth.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What I claim is:

1. For use in connection with a fixed axle and a wheel journalled on said axle, a mechanism for braking said wheel which comprises, in combination, two annular friction elements carried by the wheel coaxially therewith and opposite each other, two annular friction discs carried by said axle between said friction elements coaxially therewith, said friction discs being movable axially with respect to said axle to cooperate with said friction elements for braking purposes, a frusto-conical member having two concentric circular edges, a smaller one and a larger one respectively, coaxial with said elements and said discs and fixed angularly with respect to said axle, said frusto-conical member having a substantially uniform thickness and being provided with alternate radial ridges and grooves so as to be deformable by relative displacement of said circular edges parallel to their common axis, teeth rigid with said annular friction discs adapted to cooperate with said grooves of said frusto-conical member for preventing angular displacement of said friction discs with respect to said member, said teeth being located, for each of said friction discs, in a cylindrical surface coaxial with said discs, the respective diameters of said cylindrical surfaces being different from each other whereby two circular lines of said frusto-conical member of different respective radii are operatively connected with said friction discs respectively, and control means carried by said fixed axle for displacing one of said edges axially to bring said annular friction discs into or out of contact with said annular friction elements respectively.

2. A mechanism according to claim 1 wherein the depth of said ridges and grooves averages $\frac{1}{50}$ of the diameter of said larger circular edge.

3. A mechanism according to claim 1 wherein those of said teeth that are carried by one of said annular friction discs are in contact with the bottoms of the corresponding grooves of said frusto-conical member for all positions of said last mentioned friction disc.

4. A mechanism according to claim 1 wherein those of said teeth that are carried by one of said annular friction discs are in contact with the bottoms of the corresponding grooves of said frusto-conical member for all positions of said last mentioned friction disc, whereas, in the position where the friction discs are out of contact with said annular friction elements, the teeth carried by the other of said friction discs are out of contact with the bottoms of the corresponding grooves of said frusto-conical member.

References Cited by the Examiner
UNITED STATES PATENTS

| | | | |
|---|---|---|---|
| 1,895,590 | 1/33 | Spencer | 267—1 |
| 2,356,310 | 8/44 | Gass | 267—1 |
| 2,868,335 | 1/59 | Panhard | 188—72 |

ARTHUR L. LA POINT, *Primary Examiner.*

EUGENE G. BOTZ, *Examiner.*